(12) United States Patent
Ishii et al.

(10) Patent No.: US 8,202,010 B2
(45) Date of Patent: Jun. 19, 2012

(54) CONNECTOR COMPONENT FOR OPTICAL FIBER, MANUFACTURING METHOD THEREOF AND OPTICAL MEMBER

(75) Inventors: Futoshi Ishii, Nagahama (JP); Shuhei Yoshizawa, Shiga (JP); Tamotsu Yajima, Shiga (JP); Haruhito Araki, Shiga (JP)

(73) Assignee: Kohoku Kogyo Co., Ltd., Shiga (JP)

( * ) Notice: Subject to any disclaimer, the term of this patent is extended or adjusted under 35 U.S.C. 154(b) by 0 days.

(21) Appl. No.: 13/087,861

(22) Filed: Apr. 15, 2011

(65) Prior Publication Data

US 2011/0194819 A1     Aug. 11, 2011

Related U.S. Application Data

(60) Continuation of application No. 11/602,754, filed on Nov. 21, 2006, now abandoned, which is a division of application No. 10/196,661, filed on Jul. 16, 2002, now abandoned.

(30) Foreign Application Priority Data

Mar. 15, 2002   (JP) ................................ 2002-072710

(51) Int. Cl.
  *G02B 6/26* (2006.01)
(52) U.S. Cl. ................. 385/78; 385/80; 385/84; 65/409
(58) Field of Classification Search ............... 65/409; 385/80, 78, 84
See application file for complete search history.

(56) References Cited

U.S. PATENT DOCUMENTS

| | | | |
|---|---|---|---|
| 3,754,882 | A | 8/1973 | Van Esdonk et al. |
| 4,028,082 | A | 6/1977 | Krohn et al. |
| 4,031,423 | A | 6/1977 | Siegmund |
| 4,084,308 | A * | 4/1978 | Runge ........................ 29/527.2 |
| 4,137,060 | A | 1/1979 | Timmermann |
| 4,157,907 | A | 6/1979 | Kroyer |
| 4,261,638 | A * | 4/1981 | Wagner ........................ 385/25 |
| 4,680,047 | A | 7/1987 | Clasen et al. |
| 4,859,224 | A | 8/1989 | Clasen |
| 4,902,328 | A | 2/1990 | Knauff et al. |
| 5,063,179 | A | 11/1991 | Menashi et al. |

(Continued)

FOREIGN PATENT DOCUMENTS

DE       692 19 445 T2      8/1997

(Continued)

OTHER PUBLICATIONS

CRC Handbook of Chemistry and Physics, 1985, 66th Edition, CRC, Press, p. F-56.

(Continued)

*Primary Examiner* — John Hoffmann
(74) *Attorney, Agent, or Firm* — Ladas & Parry LLP

(57) ABSTRACT

A connector component for optical fibers has good dimensional accuracy and parallelism. The connector component includes a base material. The base material is provided with at least two holes for inserting and fixing optical fibers therein. The base material is made of quartz glass. Inner components are arranged for forming holes for inserting optical fibers in a die for forming an outer form of the connector component with a dimensional accuracy equal to or less than 2 μm. Slurry is poured into the die, the slurry including quartz powder, a resin binder, a dispersant, water and a curing agent. The poured slurry is cured and heated under vacuum so as to vitrify the cured slurry to obtain the quartz glass.

4 Claims, 3 Drawing Sheets

U.S. PATENT DOCUMENTS

| | | | |
|---|---|---|---|
| 5,120,444 | A | 6/1992 | Clasen |
| 5,123,219 | A * | 6/1992 | Beard et al. ..................... 451/41 |
| 5,183,489 | A | 2/1993 | Brehm et al. |
| 5,216,733 | A | 6/1993 | Nagase et al. |
| 5,295,210 | A | 3/1994 | Nolan et al. |
| 5,364,433 | A | 11/1994 | Nishimura et al. |
| 5,422,969 | A * | 6/1995 | Eno ................................ 385/54 |
| 5,523,266 | A | 6/1996 | Nishimura et al. |
| 5,665,133 | A | 9/1997 | Orii et al. |
| 5,710,850 | A | 1/1998 | Watanabe et al. |
| 5,742,720 | A * | 4/1998 | Kobayashi et al. ............. 385/89 |
| 5,745,626 | A | 4/1998 | Duck et al. |
| 5,891,210 | A | 4/1999 | Watanabe et al. |
| 5,922,099 | A | 7/1999 | Yoon et al. |
| 6,012,304 | A | 1/2000 | Loxley et al. |
| 6,185,962 | B1 | 2/2001 | Hartman et al. |
| 6,331,081 | B1 | 12/2001 | Ohtsuka et al. |
| 6,681,473 | B1 | 1/2004 | Liu et al. |
| 2001/0029756 | A1 | 10/2001 | Paek et al. |

FOREIGN PATENT DOCUMENTS

| | | |
|---|---|---|
| EP | 0546196 A1 | 6/1993 |
| EP | 0652184 A1 | 5/1995 |
| JP | 61-163133 A | 7/1986 |
| JP | 04-281409 A | 10/1992 |
| JP | 06-094944 A | 4/1994 |
| JP | 09-243863 A | 9/1997 |
| JP | 2001-058870 A | 3/2001 |
| WO | 98/40772 A1 | 9/1998 |
| WO | 01-04664 A2 | 1/2001 |
| WO | 01/92929 A2 | 12/2001 |

OTHER PUBLICATIONS

USPTO OA mailed Oct. 20, 2004 in connection with U.S. Appl. No. 10/196,661.
USPTO OA mailed Mar. 9, 2005 in connection with U.S. Appl. No. 10/196,661.
USPTO OA mailed Jul. 6, 2005 in connection with U.S. Appl. No. 10/196,661.
USPTO OA mailed Nov. 22, 2005 in connection with U.S. Appl. No. 10/196,661.
USPTO OA mailed Apr. 18, 2006 in connection with U.S. Appl. No. 10/196,661.
USPTO OA mailed Aug. 17, 2006 in connection with U.S. Appl. No. 10/196,661.
USPTO OA mailed Jun. 22, 2009 in connection with U.S. Appl. No. 11/602,754.
USPTO OA mailed Nov. 23, 2009 in connection with U.S. Appl. No. 11/602,754.
USPTO OA mailed May 6, 2010 in connection with U.S. Appl. No. 11/602,754.
USPTO OA mailed Jan. 18, 2011 in connection with U.S. Appl. No. 11/602,754.
R. Clasen, et al; "Herstellung von hechreinen Quarz-Substratrehren fur Lichtwellenleiter", Phillips: Unsere Forschung in Duetschland, Bd. 4 (1988): S 152-158.
I. Fanderlink, (Hrsg): "Silica Glass and its Application", Amsterdam (u.a.): Elsevier, 1991 Exact Date Not Found.
Lichtwellenleiter Einfuhrung in www.2cool4u.ch/basics/lkl-einfuhrung/wleinfuhrung.htm (erstellt im Jahr 2000).

* cited by examiner

CONNECTOR COMPONENT FOR OPTICAL FIBER, MANUFACTURING METHOD THEREOF AND OPTICAL MEMBER

BACKGROUND OF THE INVENTION

1. Field of the Invention

The present invention relates to a connector component for optical fibers, a manufacturing method therefor and an optical member for arranging optical fibers with good dimensional accuracy and good parallelism in a connector component for connecting optical fibers and in an optical communication device such as an isolator, a circulator, a splitter, a light guide, a thermochemical switch and an optical switch used in the optical communication field.

2. Description of the Related Art

In the optical communication field, a connector component for optical fibers such as a single-core ferrule or a two-core ferrule using zirconia ceramics or glass-ceramic, and a fiber array as shown in FIG. 1 in which V-shaped grooves are formed on a board made of glass-ceramic, quartz glass, and silicon are used for setting the optical axis in a connector for connecting optical fibers, an isolator and a circulator, or a ferrule and a fiber array for optical fibers used for connecting to an AWG waveguide.

However, in the connector component for optical fibers such as a ferrule for optical communication and a fiber array, when the material of the ferrule and the fiber array is zirconia ceramics, in a case where the ferrule and fiber array are mechanically stressed, the crystal structure of ceramics is transformed from tetragonal crystal to monoclinic crystal. The phase change causes an increase in the size of the ceramics. Thus, the distance between holes of the ferrule and the distance between the V-shaped grooves of a V-shaped groove type fiber array change. Accordingly, a high-accuracy optical connection cannot be maintained for the long term.

Additionally, when the material of the ferrule or the fiber array is different from the material of the optical fibers, the thermal expansion coefficient of the ferrule or the fiber array differs from the thermal expansion coefficient of the optical fibers. Therefore, the size of the ferrule or fiber array and the size of the optical fibers vary differently according to the environmental temperature. Thus, bonding surfaces of the ferrule or fiber array and the optical fibers are stressed. At the same time, there is a possibility that adhesion strength is deteriorated. Accordingly, such a connector component for optical fibers is not reliable. Further, when using the V-shaped groove type fiber array, two to three boards made of quartz are combined so as to fix optical fibers. Thus, more manufacturing processes are required. Additionally, since two to three kinds of costly adhesives are used, the assembling is complex and the cost increases. As a result, diffusion of optical communication is prevented.

SUMMARY OF THE INVENTION

It is a general object of the present invention to provide an improved and useful connector component for optical fibers, manufacturing method therefor and an optical member in which the above-mentioned problems are eliminated.

A more specific object of the present invention is to provide a connector component for optical fibers, manufacturing method therefor and an optical member that can arrange optical fibers with good dimensional accuracy and good parallelism.

In order to achieve the above-mentioned object, according to one aspect of the present invention, there is provided a connector component for optical fibers, the connector component including a base material provided with at least two holes for inserting and fixing optical fibers therein, wherein the base material is made of quartz glass (fused silica glass).

According to the above-mentioned aspect of the present invention, both optical fibers and the base material of the connector component for optical fibers (referred to as "connector component", hereinafter) are made of quartz glass. Quartz glass has a small thermal expansion coefficient. Thus, matching of thermal expansion coefficients of the optical fibers and the base material is improved. Accordingly, adhesion of the optical fibers and the connector component, such as a ferrule or a fiber array, becomes more reliable. Additionally, compared with V-shaped grooves, surface treatment of bonding surfaces is easier and the process for polishing, for example, is better. Further, the connector component is provided with two or more holes for inserting the optical fibers such that the holes are arranged with a predetermined distance there between. Therefore, by using the ferrule or the fiber array structured by a single component, it is possible to arrange and fix a plurality of optical fibers with high accuracy. The holes in the connector component for optical fibers may be arranged in not only a single line but also in a plurality of lines. For example, 8 rows×1 line, 12 rows×1 line, 40 rows×1 line, 2 rows×2 lines, 4 rows×2 lines, 4 rows×4 lines, 8 rows×8 lines, and 10 rows×8 lines.

Additionally, according to another aspect of the present invention, there is provided a manufacturing method for a connector component for optical fibers, the connector component including a base material made of quartz glass and provided with at least two holes for inserting and fixing optical fibers, the manufacturing method including the steps of: (a) arranging a plurality of inner components for forming holes for inserting optical fibers in a die for forming an outer form of the connector component with a dimensional accuracy equal to or less than 2 µm; (b) pouring slurry into the die, the slurry including quartz powder, a resin binder, a dispersant, water and a curing agent; (c) curing the poured slurry; and (d) heating the cured slurry under vacuum so as to vitrify the cured slurry to obtain the quartz glass.

According to the above-mentioned aspect of the present invention, it is possible to manufacture the connector component for optical fibers with high dimensional accuracy.

Additionally, according to another aspect of the present invention, the quartz glass may be high purity quartz glass containing equal to or more than 99.9% $SiO_2$, equal to or less than 10 ppm $Al_2O_3$, equal to or less than 1 ppm $Li_2O$, equal to or less than 10 ppm MgO, equal to or less than 10 ppm $TiO_2$, equal to or less than 10 ppm $ZrO_2$, equal to or less than 10 ppm $K_2O$, equal to or less than 10 ppm $Na_2O$, equal to or less than 10 ppm ZnO, equal to or less than 10 ppm CaO, and equal to or less than 10 ppm BaO. It is preferable that, by using the above-mentioned high purity quartz glass, the thermal expansion coefficient of the quartz glass of which the connector component is made is controlled to be in a range of 0.45~0.6× $10^{-7}$/° C., and the transmission rate of ultraviolet light having wavelength 356 nm is controlled to be equal to or more than 90%. It should be noted that the above-mentioned high purity quartz glass may include another component as long as the component thereof does not cause harm to the optical characteristics of the high purity quartz glass.

Additionally, according to another aspect of the present invention, there is provided an optical member, including: optical fibers; and a connector component for optical fibers, the connector component including a base material made of quartz glass and provided with two or more holes for inserting and fixing the optical fibers therein, wherein the connector component is fixed to ends of the optical fibers by using epoxy thermosetting type adhesive or ultraviolet curing type adhesive.

According to the above-mentioned aspect of the present invention, exposed strands of optical fibers are inserted into respective capillaries (holes), adhesive is filled in between the optical fibers and the capillaries, and a curing light is irradiated to the adhesive. Thereby, the adhesive is solidified and the optical fibers and capillaries are fixed to each other. Since the irradiated light is transmitted in the capillaries, even when the outer side is covered with an armoring material, it is possible to irradiate the curing light inside the capillaries from the ends of the capillaries. Further, the capillaries and the exposed strands of the optical fibers are more positively adhered and fixed to each other inside the capillaries by the adhesive solidified by the irradiated working light.

According to the above-mentioned aspects of the present invention, when the connector component for the optical fibers is combined with optical fibers, the composition of the connector component and the composition of the optical fibers are the same, and the thermal expansion coefficient of the connector component and the thermal expansion coefficient of the optical fibers are almost the same. Thus, stress to bonded parts does not increase since the stress is due to variation in the size of the connector component and the optical fibers caused by variation of environmental temperature. Accordingly, reliability of adhesion is higher.

The above-mentioned connector component may be more useful since the sizes of fiber arrays have been increasing recently. On the other hand, the optical member and optical component using a ferrule made of quartz and a fiber array made of quartz have advantages in that various characteristics can be obtained almost the same as design targets in optical designing. As for the various characteristics, there are the polarized wave dependent property according to a wavelength plate, reduction in loss in AWG (arrayed waveguide grating), dispersion property and transmission distance of optical fibers, for example.

Additionally, the optical member combining the connector component and optical fibers uses light-curing resin as an adhesive. At the same time, in the optical member, capillaries are formed by using a material that can transmit working light. Thus, the adhesive is cured by irradiating the working light from the ends of the capillaries. Accordingly, besides the above-mentioned effects, the capillaries and the optical fibers are fixed to each other.

Therefore, a terminal structure formed by combining the connector component and optical fibers does not need a burdensome process for solidifying the adhesive, for example, stopping work on the terminal structure for a required reaction time so that the adhesive is solidified and performing heat treatment on the terminal structure. It is possible to simply manage the terminal treatment process of optical fibers with a predetermined irradiating process. As a result, the building process can be facilitated, efficiency can be improved, and manufacturing cost can be reduced. Thus, the connector component according to the present invention is suitable for quantity production.

Other objects, features and advantages of the present invention will become more apparent from the following detailed description when read in conjunction with the following drawings.

DETAILED DESCRIPTION OF THE PREFERRED EMBODIMENTS

Figure 1:
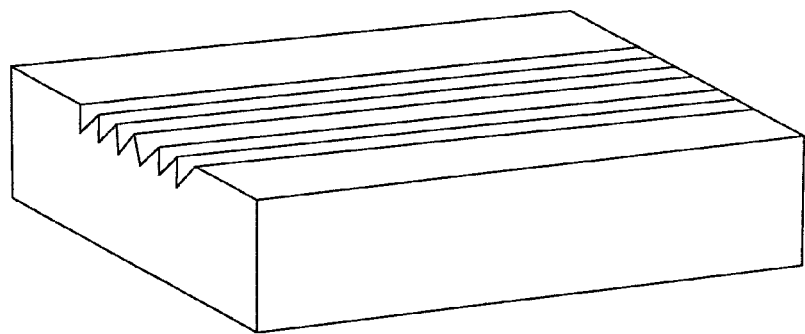
FIG. 1 is a perspective view of a conventional V-shaped groove array.

A description will be given of embodiments of the present invention, by referring to the drawings.

Figure 2A:
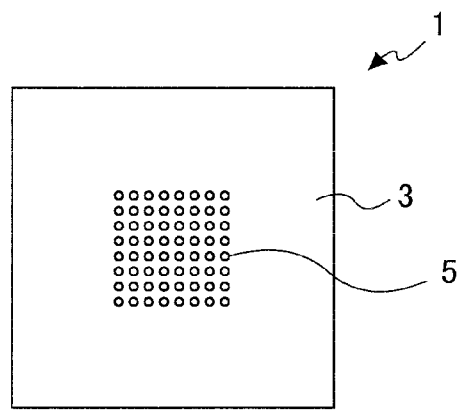
FIG. 2A is a front view of a fiber array according to an embodiment of the present invention.
Figure 2B:
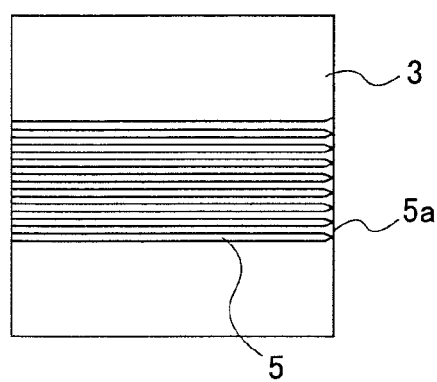
FIG. 2B is a longitudinal sectional view of the fiber array in FIG. 2A according to the embodiment of the present invention.

FIG. 2A is a front view of a fiber array 1 according to an embodiment of the present invention. FIG. 2B is a cross sectional view of the fiber array 1.

Figure 3A:
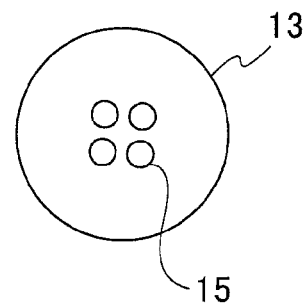
FIG. 3A is a front view of a ferrule according to another embodiment of the present invention.
Figure 3B:
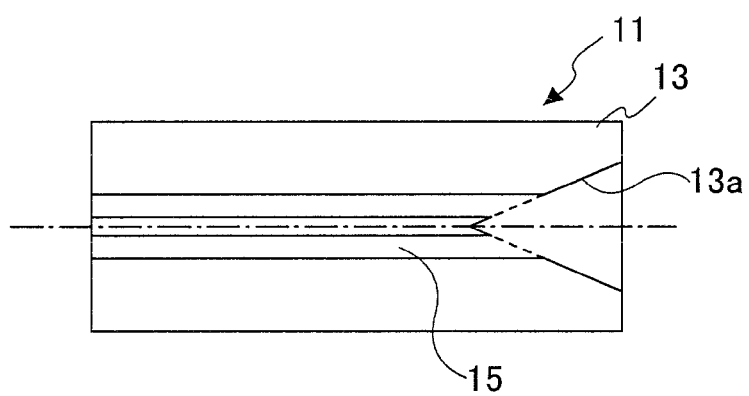
FIG. 3B is a longitudinal sectional view of the ferrule in FIG. 3A according to the embodiment of the present invention.
Figure 3C:
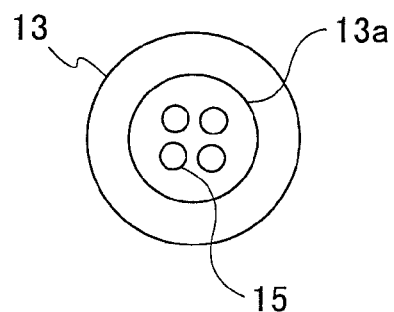
FIG. 3C is a rear view of the ferrule in FIG. 3A according to the embodiment of the present invention.

FIG. 3A is a front view of a ferrule 11 according to another embodiment of the present invention. FIG. 3B is a cross sectional view of the ferrule 11, and FIG. 3C is a rear view of the ferrule 11.

As shown in FIG. 2A, the fiber array 1 is formed by a prismatic base material 3 having a plurality of fiber insertion holes 5 therein. The fiber insertion holes 5 are arranged in a lattice state such as in an 8 rows×8 lines arrangement. Additionally, as shown in FIG. 2B, all edges of the fiber insertion holes on one side of the fiber array 1 are chamfered so as to form surfaces 5a. In addition, as shown in FIG. 3A, the ferrule 11 is formed by a column-shaped base material 13 having a plurality of fiber insertion holes 15. The fiber insertion holes 15 are arranged in a 2×2 latticed state, for example. As shown in FIGS. 3B and 3C, a cone-shaped hollow 13a is formed on one end of the ferrule 11 so that the hollow 13a communicates with the fiber insertion holes 15.

Next, a description will be given of an optical member to which the connector component for optical fibers according to the above-mentioned embodiments of the present invention is applied. It should be noted that in this specification, the word "connector component" refers to a fiber array and a ferrule, and the like.

Figure 4:
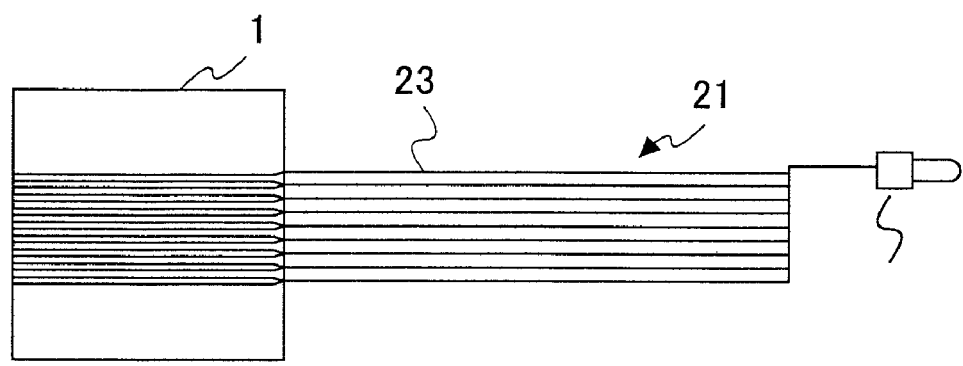
FIG. 4 is a schematic diagram showing the structure of a jumper cable using the fiber array shown in FIGS. 2A and 2B.
Figure 5:
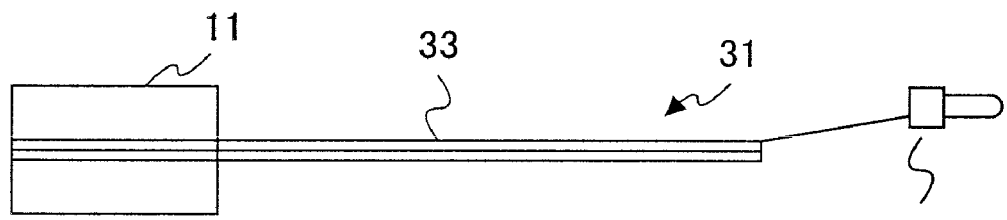
FIG. 5 is a schematic diagram showing the structure of another jumper cable using the ferrule shown in FIGS. 3A, 3B and 3C.

FIG. 4 is a schematic diagram showing the structure of a jumper cable 21 using the above-mentioned fiber array 1. FIG. 5 is a schematic diagram showing the structure of another jumper cable 31 using the above-mentioned ferrule 11.

As shown in FIG. 4, the jumper cable 21 is structured by using the fiber array 1 and optical cables 23. Additionally, as shown in FIG. 5, the jumper cable 31 is structured by using the ferrule 11 and optical fibers 33.

The connector components for optical fibers structured as mentioned above have the same material composition as optical fibers. Thus, thermal expansion coefficients of the connector components and a thermal expansion coefficient of optical cables are almost the same. Accordingly, when the connector component is combined with the optical fibers, higher reliability of adhesion is achieved since stresses to bonded parts do not increase. In this case, the stresses are caused by variations of the sizes of the connector components and optical fibers according to the variation of environmental temperature.

In the following, a description will be given of an experiment performed by the inventors of the present invention.

First, quartz powder (average particle diameter: 0.5 μm) of 99.9% purity was dispersed in alkaline solution with epoxy resin as an organic binder and an organic dispersant. Thus obtained material was put through a sieve having 200 meshes, and a hardening agent was added thereto. Thereafter, the material was defoamed by agitation under vacuum so as to obtain slip (slurry). Then, the slip was poured into a die for forming the outer form of the connector component for optical fibers. Twelve inner components for forming holes for inserting optical fibers were previously arranged in the die with a dimensional accuracy equal to or less than 2 μm. When the slip was cured, a formed material was obtained. The formed material was naturally dried for one night. Then, the formed material was tentatively sintered for an hour at 850° C. Thereafter, the formed material was sintered under vacuum atmosphere (equal to or less than $10^{-2}$ Torr).

Thus obtained sintered material was in a transparent and colorless glass state (referred to as "high purity quartz glass", hereinafter). The holes provided in the sintered material were polished using a PC wire and diamond slurry so as to form holes with a predetermined hole diameter. Then, the holes were cleaned and a desired fiber array was obtained. Table 1 shows measured results of a distance between the holes for inserting the optical fibers of the above-mentioned fiber array having 12 cores. As shown in Table 1, the holes were arranged with an accuracy of 250 μm±1 μm with respect to a design target value of 250 μm.

TABLE 1

| sample No. | distance between holes | | | | | |
|---|---|---|---|---|---|---|
| | 1-2 | 2-3 | 3-4 | 4-5 | 5-6 | 6-7 |
| 1 | 250.6 | 250.2 | 294.6 | 249.1 | 250.3 | 250.9 |
| 2 | 250.1 | 250.3 | 250.9 | 250.4 | 249.6 | 250.1 |
| 3 | 250.3 | 250.2 | 249.8 | 249.6 | 250.3 | 250.8 |
| 4 | 250.1 | 249.8 | 249.6 | 250.4 | 250.6 | 250.7 |
| 5 | 249.4 | 250.6 | 250.1 | 250.3 | 250.0 | 249.7 |

| sample No. | distance between holes | | | | |
|---|---|---|---|---|---|
| | 7-8 | 8-9 | 9-10 | 10-11 | 11-12 |
| 1 | 249.1 | 250.6 | 250.4 | 249.5 | 250.5 |
| 2 | 249.1 | 250.5 | 249.5 | 249.9 | 205.7 |
| 3 | 249.6 | 249.7 | 249.3 | 250.9 | 250.4 |
| 4 | 249.7 | 249.3 | 250.1 | 250.0 | 250.4 |
| 5 | 249.9 | 250.6 | 250.1 | 250.2 | 250.7 |

Additionally, the thermal expansion coefficient of the obtained fiber array was $0.52 \times 10^{-6}$/° C., which was almost the same thermal expansion coefficient ($0.5 \times 10^{-6}$/° C.) of quartz glass that is the material of the optical fibers. Further, the fiber array had a 92% transmission rate of ultraviolet light having wavelength 356 nm.

An ultraviolet curing type adhesive was filled in the holes for inserting optical fibers of the fiber array made of glass. Thereafter, single-mode optical fibers were inserted in the respective holes. The optical fibers were fixed by irradiating ultraviolet light for 15 minutes.

An SC type single-core ferrule was fixed on the other ends of the single-mode optical fibers by using a thermosetting adhesive. An optical fiber cable (optical member) was obtained by optically polishing ends of the fiber array and the ends of the SC type single-core ferrule.

Thus obtained optical fiber cable was maintained for 2000 hours under an atmosphere of 85% humidity and 85° C. Then, adhesion strength on the fiber array side was measured. As a result, adhesion strength not less than 12 N through 34 N was maintained. Thus, it was confirmed that the connector component according to the embodiment has high reliability in the adhesive characteristic.

In the optical member, it is preferable that polarized wave holding fibers are used for the optical fibers, so that an extinction rate is equal to or greater than 25 dB.

Additionally, in the optical member, it is preferable that each of the thermosetting type adhesive and the ultraviolet curing type adhesive has equal to or less than 0.2 dB insertion loss, equal to or more than 55 dB reflection loss, and equal to or more than 10 N tensile strength.

The present invention is not limited to the specifically disclosed embodiments, and variations and modifications may be made without departing from the scope of the present invention.

The present application is based on Japanese priority application No. 2002-072710 filed on Mar. 15, 2002, the entire contents of which are hereby incorporated by reference.

The invention claimed is:

1. An optical member, comprising:
   optical fibers; and
   a connector component comprising:
      an undivided quartz glass base having a cylindrical shape and having a cone-shaped hollow defined at one end thereof, wherein a cross-sectional area of the cone-shaped hollow is a triangle;
      fiber insertion holes defined in the quartz glass base, each fiber insertion hole having an opening end on a surface of the cone-shaped hollow defined at the one end of the quartz glass base,
      wherein the opening ends of the fiber insertion holes are arranged in rows and columns on the surface of the cone-shaped hollow defined at the one end of the quartz glass material.

2. The optical member as claimed in claim 1, wherein the optical fibers are polarization maintaining fibers, so that an extinction rate is equal to or greater than 25 dB.

3. An optical member, comprising:
   optical fibers; and
   a connector component comprising:
      a quartz glass base having a cylindrical shape and having a cone-shaped hollow defined at one end thereof, wherein a cross-sectional area of the cone-shaped hollow is a triangle;
      four fiber insertion holes defined in the quartz glass base, each fiber insertion hole having an opening end on a surface of the cone-shaped hollow defined at the one end of the quartz glass base,
      wherein the opening ends of the four fiber insertion holes are arranged around an apex of the cone-shaped hollow in an array of two rows and two columns on the surface of the cone-shaped hollow,
   wherein the optical fibers are fixed in the fiber insertion holes using epoxy thermosetting adhesive or ultraviolet curing adhesive.

4. The optical member as claimed in claim 3, wherein the optical fibers are polarization maintaining fibers, so that an extinction rate is equal to or greater than 25 dB.

* * * * *